United States Patent [19]

Nishino

[11] Patent Number: 4,623,114
[45] Date of Patent: Nov. 18, 1986

[54] SEAT FRAME FOR VEHICLE SEAT
[75] Inventor: Takaichi Nishino, Tokyo, Japan
[73] Assignee: Tachikawa Spring Co. Ltd., Tokyo, Japan
[21] Appl. No.: 413,462
[22] Filed: Aug. 31, 1982
[51] Int. Cl.[4] ............................................ F16M 13/00
[52] U.S. Cl. .................................... 248/415; 297/452
[58] Field of Search ................ 248/429, 424, 420; 297/452; 52/657

[56] References Cited

U.S. PATENT DOCUMENTS

| | | | |
|---|---|---|---|
| 1,561,470 | 11/1925 | Kihm | 52/657 |
| 3,853,373 | 12/1974 | Corbett | 248/429 |
| 4,040,232 | 8/1977 | Snow et al. | 52/657 |
| 4,050,738 | 9/1977 | Griffiths | 297/452 |
| 4,057,214 | 11/1977 | Harder | 297/452 |
| 4,078,352 | 3/1978 | Knowles | 52/693 |
| 4,123,105 | 10/1978 | Frey et al. | 297/451 |
| 4,262,963 | 4/1981 | Bauer et al. | 248/429 |
| 4,370,843 | 2/1983 | Menge | 52/657 |
| 4,548,014 | 10/1985 | Knowles | 52/693 |

FOREIGN PATENT DOCUMENTS 46-27516  8/1971  Japan .

Primary Examiner—Ramon O. Ramirez
Attorney, Agent, or Firm—Sandler & Greenblum

[57] ABSTRACT

A light seat frame for a vehicle seat containing a seat cushion, which can slide forward and backward, containing a reinforcing arm, fixed between a front member and left and right side members of the frame to resist deformation.

6 Claims, 4 Drawing Figures

FIG. I
PRIOR ART
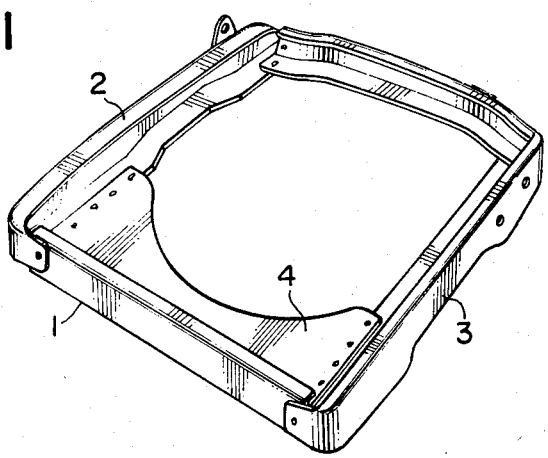
FIG. 2
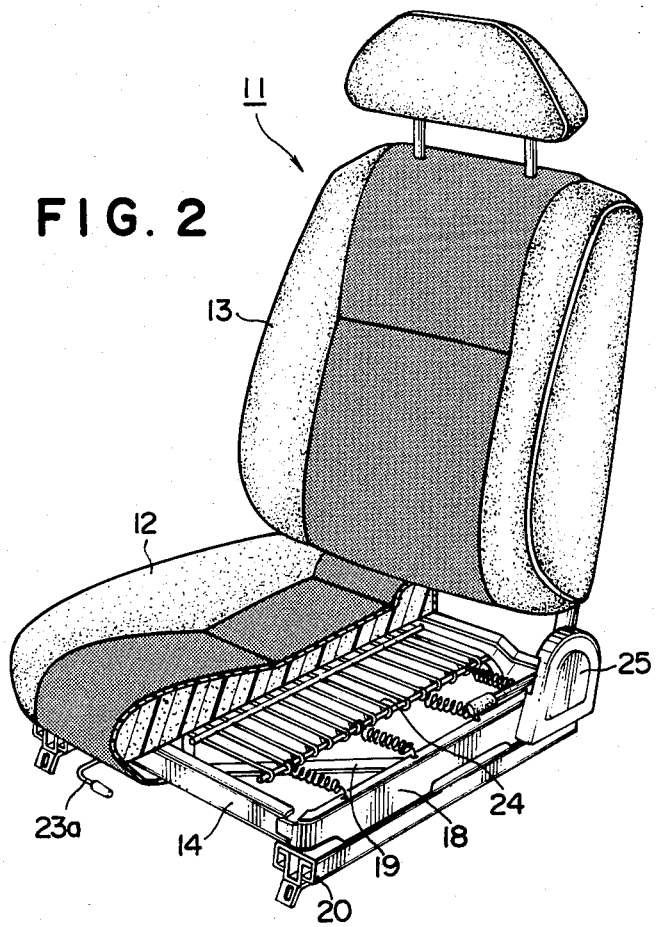

SEAT FRAME FOR VEHICLE SEAT

BACKGROUND OF THE INVENTION

1. Field of the Invention

This invention relates to an improved seat frame for a vehicle seat, provided with a V-shaped reinforcing arm, which has the twin benefits of being light and resisting deformation of the seat frame.

2. Description of the Prior Art

In a vehicle seat, particularly a driver's seat, a slide adjustment apparatus is conventionally provided between the seat cushion and the vehicle floor, so as to adjust the forward and backward movement to meet the driver's sitting posture.

The slide adjustment apparatus normally consists of a pair of movable rails and fixed rails therebelow. The movable rails slide on the fixed rails, which in turn are secured to the floor, and the movable rails are stopped by the driver when the seat cushion is moved to a desired position. The locking mechanism to maintain this desired position, is provided on one rail side only. Accordingly, when load is applied to the seat cushion due to the forward acceleration of the vehicle, the movable rail to which the locking mechanism is not attached, and not the fixed rail, carries the load at that side, although the movable and fixed rails both carry and resist the load at the side the slide adjustment and locking mechanism is provided. Thus, the load is actually applied to one side of the seat cushion frame only. Accordingly, it will be appreciated that the frame will be deformed to the shape of a parallelogram. Repetition of the application of this unbalanced load, will result ultimately in damage to the frame, and this damage will be substantial to a seat frame which is formed of nonintegral parts.

In order to meet with these difficulties, the conventional seat frame, of FIG. 1, which is representative of the prior art, is reinforced by a reinforcing plate 4, positioned between side members 2 and 3. However, since plate 4 is big, frame 1 is inevitably heavy and is, therefore, expensive.

SUMMARY OF THE INVENTION

The present invention aims at overcoming the drawbacks mentioned above. According to the invention, there is provided two embodiments of an improved seat frame which resists deformation to a parallelogram and, therefore, allows the location of the slide adjustment and locking apparatus to be situated on one side only. Additionally this invention provides for the use of smaller reinforcing members, as compared to the prior art, so as to make the seat frame lighter than the conventional frame.

In order to achieve these objects a seat frame is provided for a vehicle seat of the type wherein a seat cushion can be slid forward and backward, and wherein a V-shaped reinforcing arm is fixed between a front member and left and right side members, of the seat frame of the seat cushion. Thus, since the reinforcing arm is connected to the front member and to both side members, the three members are integrally fixed to each other. Consequently, improved strength is obtained resisting deformation to a parallelogram. Therefore, even if locking action of the slide adjusting apparatus is carried out on one side rail only, damage or defective deformation is greatly reduced.

In addition, since a reinforcing arm of smaller size than that of a conventional arm can be used, the weight of the entire seat frame can be lightened. Moreover, since the reinforcing arm connects both side frame members, the locking positioning need be carried out only at one side. Accordingly, the positioning operation is carried out easily and precisely. In this way, the assembling work becomes simpler and, thus, a saving in assembling cost is realized.

BRIEF DESCRIPTION OF THE DRAWINGS

FIG. 1 is a perspective view of the conventional seat frame;

FIG. 2 is a perspective view, partially in section, of the vehicle seat to which a first embodiment of the seat frame according to the invention is applied;

DETAILED DESCRIPTION OF THE EMBODIMENTS OF THE INVENTION

In FIG. 2, reference 11 represents generally the vehicle seat to which the apparatus of the invention is applied. Seat 11 includes seat cushion 12 having a seat frame 14 to which the apparatus of the invention is applied, and a seat back 13.

Figure 3:
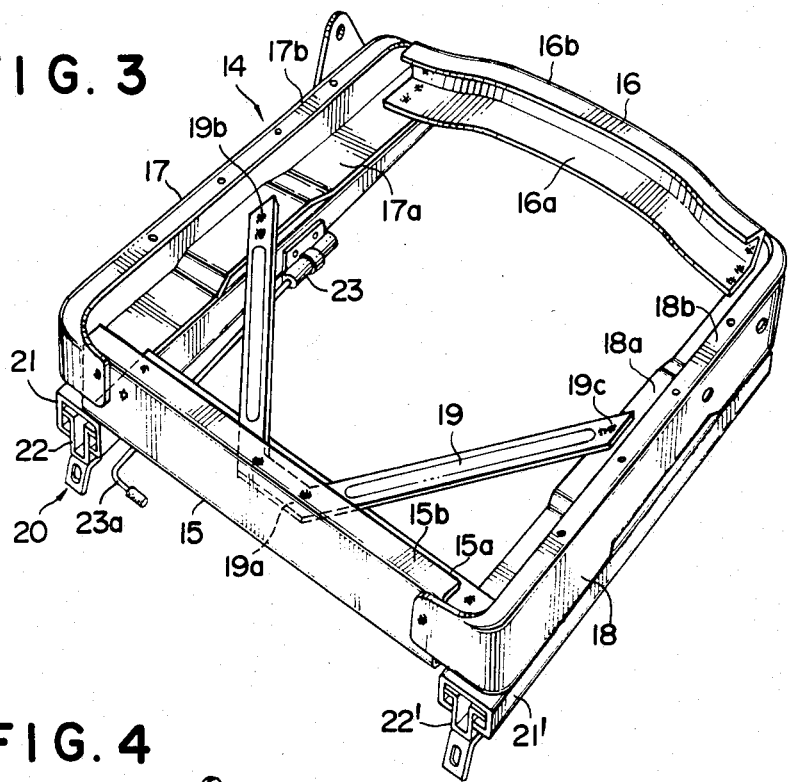
FIG. 3 is a perspective view of the first embodiment of the seat frame.

Seat frame 14, as shown in FIG. 3, has front and rear members 15 and 16 formed of steel plate, and right and left side connecting members 17 and 18 welded to the front and rear members to form a generally rectangular shape. Frame 14 further includes a reinforcing arm 19, provided between front member 15, and the two side members 17 and 18. Arm 19 is welded by a spot-welding method or the like at its center bent portion 19a, to lower flange 15a of the front member 15, and at its two sides or extensions at 19b and 19c to lower flanges 17a and 18a respectively, of the two side members 17 and 18.

Seat frame 14 is provided with movable rails 21 and 21' of the slide adjustment apparatus 20, under its side members 17 and 18 respectively. Movable rails 21 and 21' are slidable with regard to respective fixed rails 22 and 22', i.e., fixed to the car floor. A locking device 23 is provided adjacent to rail 21 and its corresponding fixed rail 22, so that the slide adjustment device 20 can be locked at one rail side only. Operating lever 23a of the locking device 23 projects at the front of the seat frame.

In FIG. 2, reference 24 illustrates padding members extended between and above each of upper flanges 15b, 16b, 17b, and 18b of seat frame members 15, 16, 17 and 18 and reference 25 represents a reclining device for adjusting inclining angles.

Figure 4:
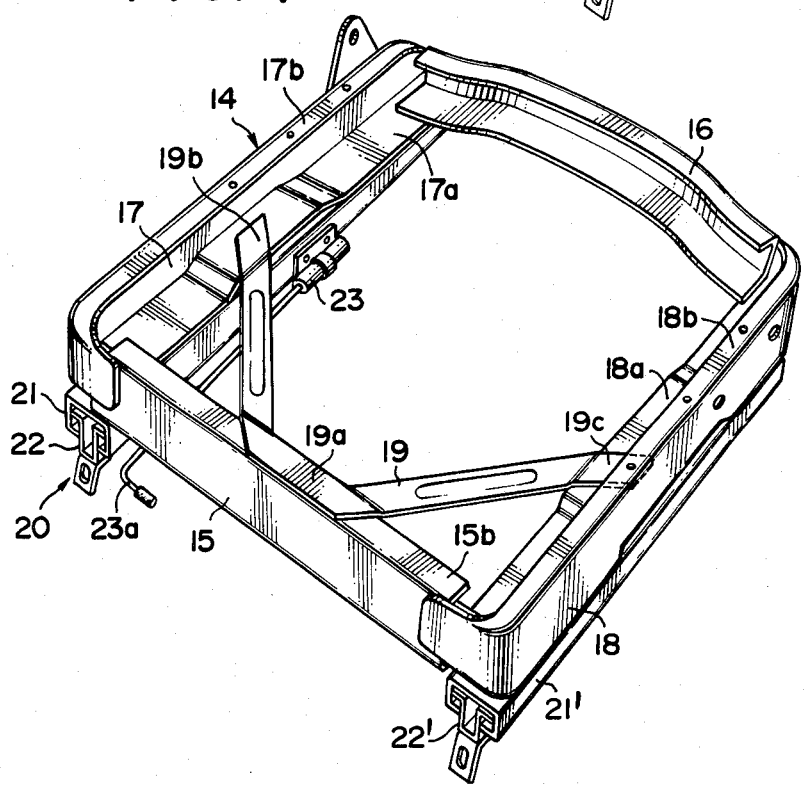
FIG. 4 is a perspective view of the second embodiment of the seat frame.

FIG. 4 illustrates a second embodiment of the invention. According to this embodiment, reinforcing arm 19 is fixed on upper flange 15b of front member 15, and on lower flanges 17a and 18a of side members 17 and 18 respectively, of seat frame 14.

Since the two-sided or double extending arm 19, in FIG. 4, is inclined in such a manner that the rear part of arm 19 is lower than the front part, the seat frame surface conforms to the hip shape of the person who sits on the seat due to this downward inclination to the rear. Therefore, the person will be prevented from slipping forward. Further, since the frame structure is not close to his hip, he can sit comfortably. In addition, since a space is produced at the lower part of the front member 15 of both embodiments, accessary members such as a lifting device may be provided at this spaced portion.

In all cases, it is understood that the above-described embodiments are merely illustrative of the many possible specific embodiments which represent applications of the present invention. Numerous and varied other arrangements can readily be devised without departing from the spirit and scope of the invention.

I claim:

1. A seat frame for a cushioned vehicle seat, said frame being adapted to slidably move forward and backward, said seat frame comprising a front, two side connecting members, and a reinforcing arm, said reinforcing arm being generally V-shaped and connected at its center to the front member of said seat frame and having two extensions which are attached to said two side connecting members of said seat frame, respectively, said seat frame having an upper edge and said V-shaped reinforcing arm being substantially located below said upper frame edge.

2. The seat frame of claim 1, said seat frame further comprising a rear connecting member and being generally rectangular.

3. The seat frame of claim 2, wherein said seat frame comprises a locking mechanism for restriction of movement of said seat frame, said locking mechanism being located on one side of said frame.

4. The seat frame of claim 1, wherein said front and two side connecting members of said seat frame each contain lower flanges, with said V-shaped reinforcing arm connected at its center to the lower flange of said front member and said extensions of the V-shaped reinforcing arm connected to the lower flanges of the two side connecting members respectively, of said seat frame.

5. The seat frame of claim 1, wherein said V-shaped reinforcing arm is downwardly inclined toward the rear of the frame.

6. The seat frame of claim 1, wherein said front member contains an upper flange and said two side connecting members each have lower flanges, and wherein said reinforcing arm is attached at its V center to said upper flange of the front member and said extensions are respectively connected to said two lower flanges of said side connecting members.

* * * * *

UNITED STATES PATENT AND TRADEMARK OFFICE
CERTIFICATE OF CORRECTION

PATENT NO. : 4,623,114

DATED : November 18, 1986

INVENTOR(S) : Takaichai NISHINO

It is certified that error appears in the above-identified patent and that said Letters Patent is hereby corrected as shown below:

At Column 1, line 22, after "position", "," should be deleted;

At Column 1, line 33, after "unbalanced load", "," should be deleted;

At Column 2, line 36, after "portion 19a", "," should be deleted: and

At Column 4, line 22, "V center" should be ---V-center---.

Signed and Sealed this

Ninth Day of February, 1988

Attest:

DONALD J. QUIGG

Attesting Officer

Commissioner of Patents and Trademarks